Patented Oct. 24, 1933

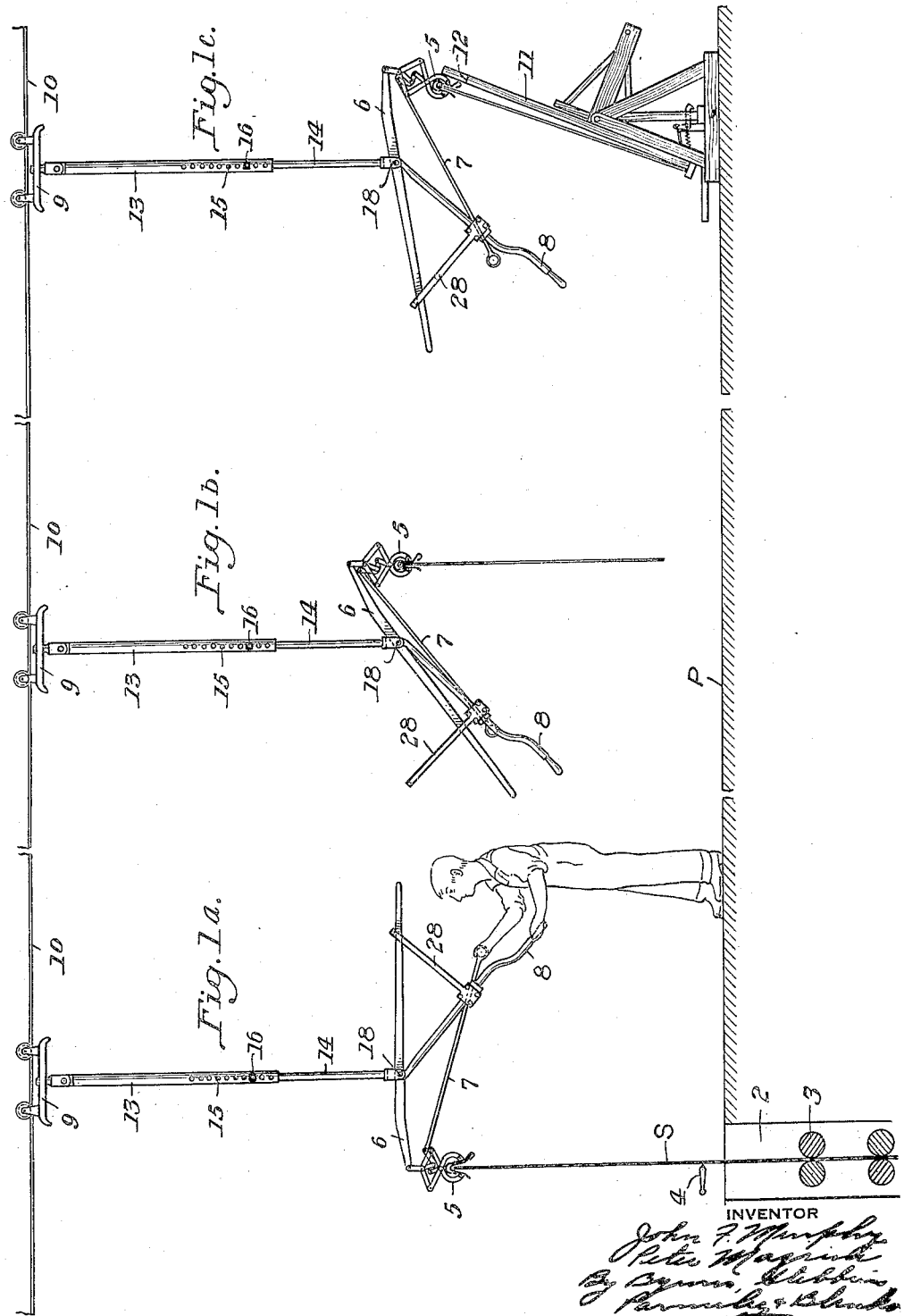

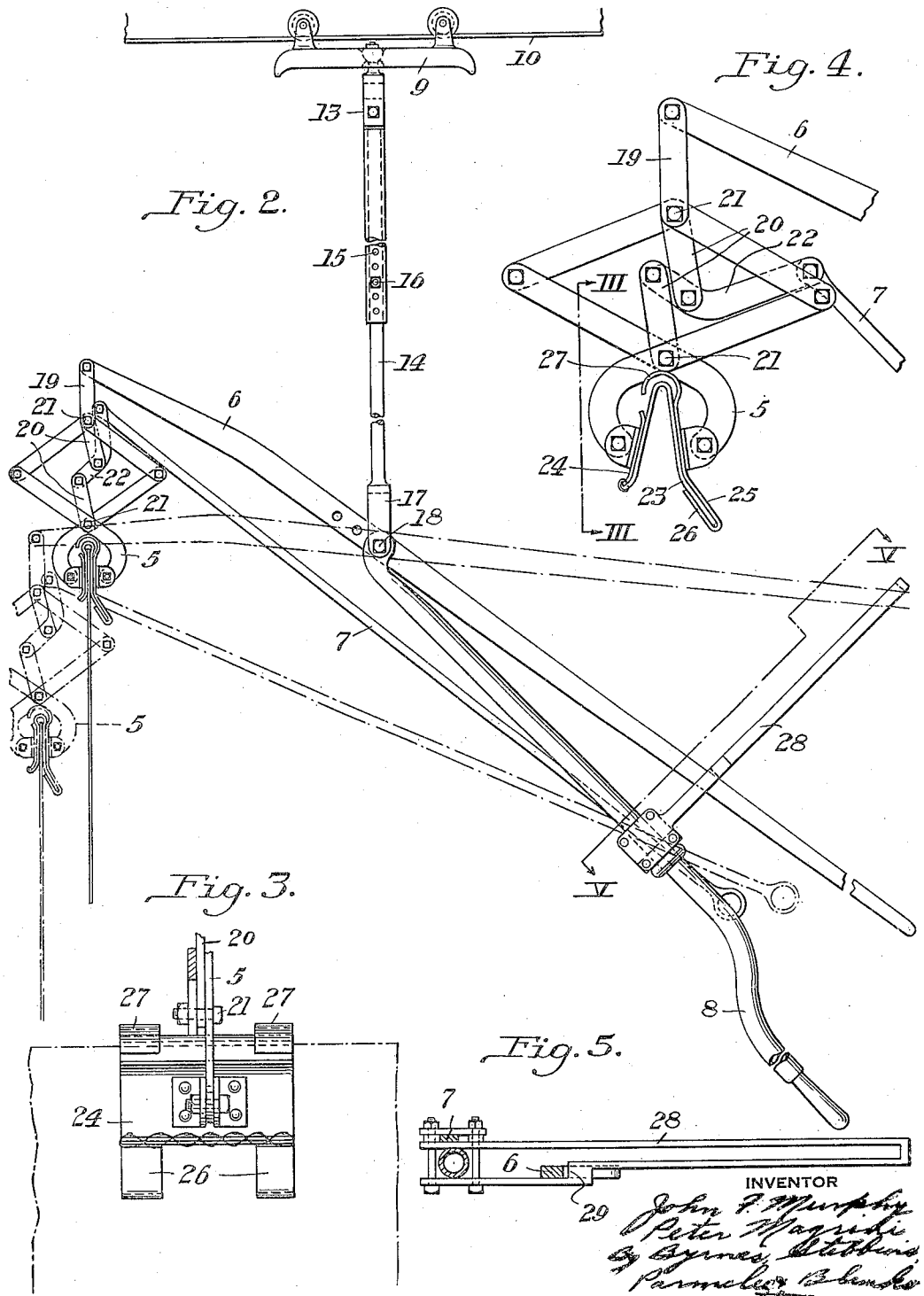

1,931,700

UNITED STATES PATENT OFFICE 1,931,700

HANDLING GLASS SHEETS

John F. Murphy, Arnold, and Peter Magrini, Belle Vernon, Pa., assignors to American Window Glass Company, Pittsburgh, Pa., a corporation of Pennsylvania Application January 9, 1930. Serial No. 419,546

10 Claims. (Cl. 49—17)

This invention relates to the handling of glass sheets and particularly to the handling of the same as they issue from vertical sheet drawing machines, such as those of the Fourcault type.

In the Fourcault process glass sheets are drawn upwardly through a slotted floater or debiteuse in a bath of molten glass by means of draft rollers in a cooling or annealing tunnel. This tunnel is relatively short and the glass is quite hot when the draft rollers project the top portion of the sheet upwardly from the top of the tunnel. When a sufficient length to form a sheet has issued, the rising glass is scored crosswise by a cutting tool, and the sheet portion above the cut is flexed sidewise to cause it to break off. This sidewise flexing has always been done by a workman who has then held the sheet in his hands and carried it to a receiving table. Such practice is undesirable for several reasons. The glass sheets, particularly for double strength glass of considerable width, are very heavy and frequently two men are required to handle them. The glass being hot, it may shatter if improperly handled, cutting the workmen and causing broken glass to drop into the tunnel and interfere with the subsequent drawing operation. The flexing of the sheet to cause breakage on the line of the cut is frequently improperly done, resulting in broken glass and a decrease in the quantity of production. Staining of the glass by reason of perspiration from the workmen is common.

One of the great advantages of the Fourcault process is its low cost. In order to keep costs at a minimum it is desirable to use relatively unskilled labor and to manufacture sheets of great width. However, because of the difficulty of handling these large sheets, it has been necessary to train men to handle the heavy glass sheets, and even with such training the work is hot, arduous and frequently dangerous.

We provide for handling the sheets out of supporting engagement with the operator in such manner that the breakage is reduced or eliminated. The flexing of the glass to cause it to part from the rising sheet on the scored line is properly done, and the heavy sheets are handled with a minimum of effort.

We employ a gripper which is preferably arranged on an overhead trolley. The gripper preferably engages the top edge of the rising glass and is then moved sidewise to cause flexing of the sheet and cracking off along the line of the cut. This leaves the severed sheet supported entirely from the gripper, and the workman then moves it to the receiving table. Instead of having to spread his arms far apart to engage the widely separated edges of the rising sheet, he simply guides the gripped sheet by suitable handles. He is several feet removed from the sheet, thereby eliminating any danger to him and keeping him out of the heat. With the old method of carrying the sheets by hand, they frequently became bowed so much in carrying that they shattered in the workman's hands, showering him with broken glass.

In the accompanying drawings, illustrating the present preferred embodiment of the invention, Figure 1 is a view showing the general arrangement of the transfer device in connection with the glass drawing machine and the receiving table, and divided into three parts, Figure 1a, Figure 1b and Figure 1c to show the several stages in handling;

Figure 2 is a side elevation to enlarged scale of the transfer device;

Figure 3 is a view taken on the line III—III of Figure 4 and showing the gripper;

Figure 4 is a side elevation of the gripper; and

Figure 5 is a section taken on the line V—V of Figure 2.

Figure 1 illustrates a glass drawing machine, indicated generally by the reference character 2, and comprising draft rollers 3 which draw a sheet S of glass upwardly from a bath, not shown, and project it beyond the top of the drawing machine. As the glass rises, it is scored at intervals by a cutting tool, indicated diagrammatically at 4. The upper edge of the rising glass is next engaged by tongs 5 on the arm 6 of the transfer device. The tongs are controlled by a handle 7 moved by the operator as hereinafter described in detail. When the glass has been gripped by the tongs, the workman so moves the handle 8 of the transfer device as to flex the sheet laterally, thus causing it to break along the scored line. As soon as this occurs, the severed sheet springs free of the rising glass and hangs supported from the tongs 5.

The transfer device is carried on a trolley 9 running on an overhead track 10. The trolley 9 is moved along the track, as shown in Figure 1b, by the workman. A receiving table 11 is placed on the workman's platform P to receive the sheet, and Figure 1c shows the sheet as it is being disposed on this table. A recess, indicated at 12, is formed in the receiving table to accommodate the gripper 5 and permit the sheet to lay flat on the table before the gripper is disengaged. A workman will grasp the sheet at approximately its center point, and the recess 12 will be correspondingly placed in the receiving table 11, thus insuring proper positioning of the sheet on the receiving table.

The construction of the transfer device is shown in detail in Figures 2 to 5 inclusive. The trolley 9 carries a swiveled hanger 13 which telescopes with a rod 14. A series of holes 15 is provided in the hanger 13 and the rod 14 to receive a billet 16, whereby the height of the transfer device above the platform may be adjusted.

A yoke 17 is provided at the lower end of the rod 14 to accommodate the lever 6 and the handle 8, both of which are pivoted on a bolt 18. The lever 6 carries a link 19 at its outer end to which the several links forming the tongs 5 are attached. Short links 20 are attached to the pivot bolts 21 of the tongs and an arm 22 is connected to the links 20 for opening the gripper. The lever 22 is connected to the handle 7 as shown. The gripper proper comprises a fold 23 of fibrous material, such as belting, having its opposite ends secured to backing plates 24 and 25, pivoted on the arms of the tongs. The backing plate 25 extends outwardly below the backing plate 24 and has a portion 26 which is folded around the edge of the fibrous material 23. This aids in guiding the gripper onto the sheet.

When the sheet is to be engaged the handle 7 is pulled so as to open the tongs to the position of Figure 4. The gripper is then lowered onto the glass sheet and the handle is pushed to close the tongs and engage the glass. Once the gripper makes contact with the glass, the weight of the sheet itself causes the gripper to continue in firm engagement with the glass.

The backing plate 25 is carried upwardly and has a portion 27 which limits any upward movement of the gripping material 23 in the event that it becomes loosened. The handle 8 carries a side loop 28, as best shown in Figure 5. The side loop has an offset shoulder 29 to engage the lever 6.

Referring to Figure 1a, it will be noted that when the rising glass is disengaged, the lever 6 lies in a generally horizontal position. After the glass has been gripped, the lever 6 is pulled downwardly by the workman. This gives the lateral pressure to the glass desired for breaking it off on the scored line. At the same time the severed sheet is raised clear of the glass as it rises in the drawing chamber 2.

When the lever 6 has been pulled down to its lowermost position, it is slipped under the shoulder 29 to hold it in the position of Figure 1b. When the receiving table 11 is reached, the lever is disengaged from the shoulder 29 so as to lower the sheet onto the table. With this arrangement the handle 8 is always at a convenient height for removing by the workman. This is important in handling the very large sheets produced. At the same time, the movement of the glass can be nicely controlled by the lever 6. We have illustrated and described a present preferred embodiment of the invention. It will be understood, however, that it is not limited to the form shown but may be otherwise embodied or practiced within the scope of the following claims.

We claim:

1. A device for handling drawn glass sheets comprising a support, a pivoted arm thereon, a gripper on the arm, means for actuating the gripper, and a handle for moving the device, the pivoted arm being tiltable relative to the handle.

2. A device for handling drawn glass sheets comprising a support, a pivoted arm thereon, a gripper on the arm, means for actuating the gripper, a handle for moving the device, the pivoted arm being tiltable relative to the handle, and means for controlling the amount of such relative movement.

3. A device for handling drawn glass sheets comprising a support, a handle, an arm pivoted for movement relative to the handle, and a gripper on the arm.

4. A device for handling drawn glass sheets comprising a support, a handle, an arm pivoted for movement relative to the handle, a gripper on the arm, and a yoke on the handle for limiting the movement of the pivoted arm.

5. A device for handling drawn glass sheets comprising a support, a handle, an arm pivoted for movement relative to the handle, a gripper on the arm, and a yoke on the handle for limiting the movement of the pivoted arm, the yoke having a shoulder adapted to engage the arm.

6. A device for handling drawn glass sheets comprising a support, a tongs thereon, and a fold of fibrous material and backing means therefor, the backing means on one side of said fold extending downwardly beyond the backing means on the other side of said fold.

7. In combination with a machine for drawing sheet glass upwardly, a movably mounted support, an arm pivotally mounted on the support, a gripper on the arm and a handle on the support, the pivoted arm being tiltable relative to the handle.

8. In combination with a machine for drawing sheet glass upwardly, a movably mounted support, an arm pivotally mounted on the support, a gripper on the arm, a handle on the support, the pivoted arm being tiltable relative to the handle, and means for actuating the gripper.

9. A device for handling drawn glass sheets comprising a support, a pivoted arm thereon, a plurality of arms mounted on said pivoted arm arranged to form a gripper, and means for actuating the gripper, the arms forming the gripper being so arranged that when clamped on a glass sheet the weight of the sheet will tighten the gripper.

10. In combination with a machine for drawing sheet glass upwardly, a horizontally extending track, supporting means on said track, a pivotally mounted arm on said supporting means, a gripper on said pivoted arm, the gripper being arranged to engage the upper portion of the glass sheet as it rises from the machine and support said upper portion after the same has been severed from the main body of the sheet, and a rod pivotally attached to the gripper for actuating the same and bringing it into or moving it out of engagement with the glass sheet, the gripper being also arranged so that when clamped on a glass sheet the weight of the sheet will tighten the gripper.

JOHN F. MURPHY.
PETER MAGRINI.